C. M. BELL.
TRACTION WHEEL.
APPLICATION FILED MAR. 9, 1907.
926,844.
Patented July 6, 1909.
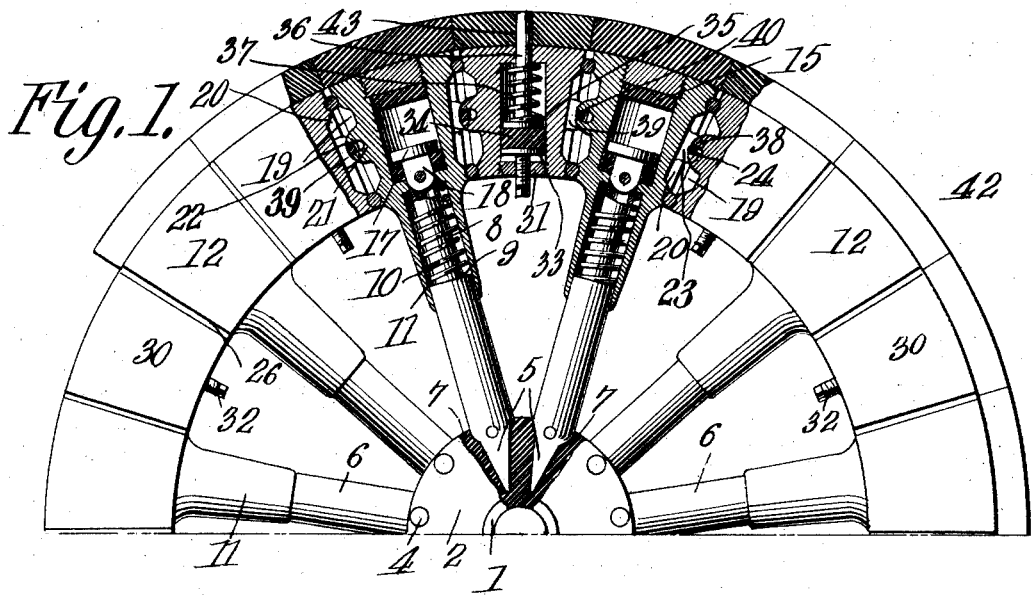
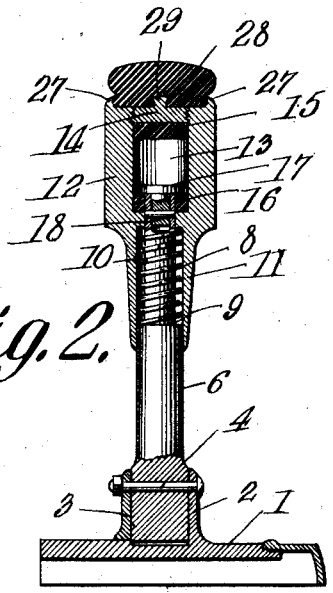
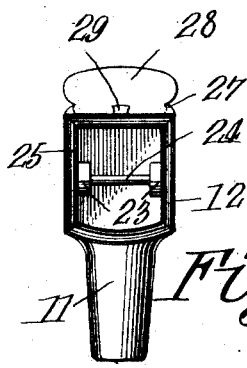
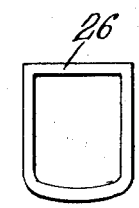
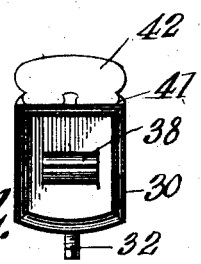
Carroll M. Bell,
INVENTOR.
WITNESSES:
By C. A. Snow & Co.
ATTORNEYS

UNITED STATES PATENT OFFICE.

CARROLL M. BELL, OF GOODLAND, INDIANA.

TRACTION-WHEEL.

No. 926,844.      Specification of Letters Patent.      Patented July 6, 1909.

Application filed March 9, 1907. Serial No. 361,514.

*To all whom it may concern:*

Be it known that I, CARROLL M. BELL, a citizen of the United States, residing at Goodland, in the county of Newton and State of Indiana, have invented a new and useful Traction-Wheel, of which the following is a specification.

This invention relates to traction wheels of that character utilizing flexible rims and designed to be substituted for wheels provided with pneumatic tires.

The object of the invention is to provide a rim made up of sections of novel construction which are movably connected so that the rim is capable of flexing when subjected to a weight or when passing over an uneven surface.

A still further object is to provide sections which interlock so that they can not become displaced while the wheel is in use.

A still further object is to so mount certain of the sections upon the spokes of the wheel as to enable said sections to work thereon.

Another object is to provide a wheel having its spokes yieldingly connected to the hub to increase the resiliency of the wheel.

A still further object is to provide gripping devices yieldingly connected to certain sections of the rim whereby slipping of the wheel is prevented.

Another object is to provide a wheel having a sectional rubber tire, one section of the tire being connected to each rim section and all of said tire sections contacting at their ends and constituting a cushion.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a view partly in elevation and partly in section of a portion of a wheel constructed in accordance with the present invention; Fig. 2 is a transverse section through one of the spoke engaging sections, the connection between the spoke and the hub being shown in section; Fig. 3 is a face view of one of the spoke engaging sections; Fig. 4 is a similar view of one of the intermediate sections; and Fig. 5 is a detail view of a gasket used with the sections.

Referring to the figures by characters of reference, 1 is a hub having an annular flange 2 and surrounded by a rim 3 which is detachable from the hub. The rim and flange are connected by bolts 4, each bolt extending through the inner or tapered end 5 of a spoke 6. The adjoining faces of the tapered portions of the spokes are normally substantially parallel and interposed between them are cushions 7 preferably of rubber and which serve to hold the spokes normally in predetermined relation to one another. The outer end of each spoke is reduced in diameter, as shown at 8, to form a shoulder 9 against which abuts one end of a coiled spring 10. This spring and the reduced portion of the spoke are surrounded by a sleeve 11 formed with the inner end of a rim section 12. Said section is preferably formed of a hollow casting, the recess 13 in which is closed at its outer end by means of a screw plug 14. This plug has a rubber cushion 15 upon its inner face, and another rubber cushion 16 is disposed upon the opposite wall of the recess 13 and constitutes an abutment for a head 17. Said head is provided with an ear 18 which is pivotally connected to the end of the spoke. Spring 10 bears against one end of the sleeve 11 so as to hold the head 17 normally in contact with the cushion 16.

The ear 18 of each head 17 may be connected to the end of its spoke by inserting a pivot pin through the wall of the rim section and then through the ear 18 and the end of the spoke after which the opening in the wall of the rim section may be permanently or temporarily closed in any preferred manner. If desired any other means for connecting the head to the spoke may be utilized to suit the convenience of the mechanic.

As shown in Fig. 2, the side faces of the section 12 are substantially parallel and as shown in Fig. 1, the remaining faces of said section are converged and are formed with recesses 19 and 20 respectively. The recess 19 is formed with a transversely extending rib 21 having a groove 22 formed longitudinally therein, and ears 23 are formed with the recess 20 and are connected by a cross pin 24. A groove 25 is formed around each recess 19 and 20 and is designed to receive a rubber gasket 26 which is shaped to fit snugly within the groove and to project therebeyond. Inwardly extending flanges 27 are formed along the outer edges of the sides faces of section 12 and bite into the side portions of a tire section 28. A rib 29 also extends along the center of the outer face of the section 12 and across the plug 14 and this rib has its outer end enlarged and embedded within the tire section. Said tire section is preferably formed of solid rubber and is held securely against displacement by the flange 27 and the rib 29.

Interposed between the other two sections 12 is an intermediate rim section 30. Each of these sections is in the form of a hollow casting, the inner end of which is closed by a screw plug 31, through which extends a set screw 32. This set screw bears against a disk 33 on which is mounted a rubber cushion 34. Said cushion is contacted by the head 35 of a stem 36 which projects through the outer face of the section 30 and has a coiled spring 37 therearound and bearing at opposite ends upon the head 35 and against the inner end wall of the section 30. As shown in Fig. 4, the side faces of each of these intermediate sections are substantially parallel, whereas as shown in Fig. 1 the remaining faces converge and are recessed in the same manner as are the sections 12 there being a grooved rib 38 in one of the recesses and designed to receive the pin 24 of the adjoining section 12. Ears 39 are arranged in the other recesses of the section 30 and are connected by a coupling pin 40 designed to project into the grooved rib of the adjoining section 12. Grooves are formed within each of the recessed faces of section 30 to receive those portions of the gaskets 26 which project beyond the grooves within the sections 12. Flanges 41, similar to the flanges 27, are formed along the outer edges of the side faces of each section 30 and engage rubber tire sections 42 which, when all of the rim sections are connected, abut at their ends so that each tire section is compressed longitudinally. Each of the tire sections 42 has an opening 43 therein within which the stem 36 is mounted and the end of said stem is normally flush with the outer face of the tire section 42.

It will be seen that by constructing a rim in the manner herein described the sections interlock and can not become accidentally detached. In view of the fact, however, that the pins 24 and 40 are movably mounted within the grooved ribs 21 and 38, the various rim sections can be pressed inwardly toward the hub. The inward movement of the sections 12 will be resisted by the springs 10 as will also the inward movement of the adjoining intermediate sections 30. The gaskets 26 constituting spacing connections between the sections and the cushions 7 between the inner ends of the spokes permit a certain oscillatory movement of the spokes, which greatly increases the resilient action of the wheel. Should the sections 12 be pressed inward to a certain extent and subjected to a load, the head 17 will be brought into contact with the cushion 15 so that jarring will be prevented.

When any one of the sections of the rim is pressed inward the tire section connected thereto will be elongated longitudinally and this will cause an annular compression of the entire tire, inasmuch as all of the tire sections abut at all times. This feature also adds to the efficiency of the wheel because it renders the same more resilient. When the wheel is subjected to a load the stems 36 project beyond the compressed tire sections 42 and prevent the wheel from slipping or skidding. The stem 36 can be adjusted so that its end will lie flush with the upper face of the tire section simply by turning the set screw 32. It will be noted that each of the sections is formed in a single casting and that access may be readily had to the interior of any one of the sections without removing it from the wheel and simply by unscrewing the plug which is used as a closure therefor. By utilizing cushions 7 the sudden starting of the wheel will not result in injury thereto as the hub will be free to partly rotate independently of the rim thereby preventing injury to the wheel such as often results from the jerking produced by sudden starts.

What is claimed is:

1. A wheel comprising yieldingly supported rim sections, intermediate sections supported solely thereby and interposed therebetween and movably connected thereto, and elastic spacing devices entirely disposed between the sections.

2. A wheel comprising yieldingly supported rim sections, intermediate sections movably connected thereto and supported thereby, and an elastic tire section upon each of the rim sections, said tire sections having abutting ends.

3. A wheel comprising yieldingly supported rim sections, cushioning devices within said sections for limiting their movement, and intermediate sections movably connected to and supported by the yieldingly supported sections.

4. A wheel consisting of yieldingly supported rim sections, intermediate sections movably engaging projecting devices upon the rim sections, and cushioning means interposed between the rim sections.

5. A wheel comprising yieldingly supported rim sections, intermediate sections, movably connected projecting devices upon the adjoining faces of the sections, and an elastic tire section upon each rim section, the ends of the sections abutting.

6. A wheel comprising spokes disposed to independently oscillate, cushioning devices interposed between the spokes to retard their oscillation, and a flexible rim connected to the spokes.

7. A wheel comprising spokes disposed to independently oscillate, cushioning devices interposed therebetween to retard oscillation, and a sectional flexible rim connected to the spokes.

8. A wheel comprising a hub, a flexible rim, connecting devices movably engaging the rim and disposed to oscillate upon the hub, and means for retarding the oscillatory movement of said devices upon the hub.

9. A wheel comprising a hub, a flexible rim, connecting devices movably engaging the rim and disposed to oscillate upon the hub, and means for retarding the movement of the rim upon said devices.

10. A wheel comprising yieldingly supported rim sections, intermediate rim sections movably connected thereto and supported thereby, abutting tire sections upon the rim sections, and elastic spacing devices interposed between the sections.

11. A wheel comprising yieldingly supported rim sections, intermediate sections movably connected thereto and supported thereby, and an anti-slipping device movably mounted within each intermediate section.

12. A wheel comprising a yieldingly supported flexible rim, abutting tire sections carried thereby, and a yieldingly supported stem movably mounted within the rim and one of the tire sections.

13. A wheel having a flexible rim, a compressible tire surrounding the rim, and spring controlled anti-slipping devices within the rim and projecting into the tire, said devices being exposed when the tire is compressed.

14. A wheel having a sectional rim, a spring controlled device within one of the sections and disposed to project therefrom, a cushion for limiting the movement of said device, and means for adjusting the cushion and the device within the section.

15. A wheel comprising pivotally connected spokes, rim sections movably mounted thereon, cushioning devices interposed between the spokes and rim sections, a head upon each spoke and movably mounted in one of the rim sections, cushioning devices in the paths of the heads, and intermediate rim sections interposed between and movably connected to the spoke engaging rim sections.

16. A wheel having a pivotally supported spoke, a hollow rim section movably mounted thereon, a cushioning device interposed between the spoke and rim section, a head upon the spoke and movably mounted within the rim section, cushioning devices in the path of the head, and means for closing the rim section.

17. A wheel having a pivotally mounted spoke, a cushioning device therefor, a hollow rim movably mounted upon the spoke, cushioning means for controlling the movement of the section upon the spoke, a closure for said section, and a tire section engaging one end of the section and the closure.

18. A wheel comprising yieldingly supported rim sections, a grooved projection upon one face of one of the sections, a locking pin upon one of the faces of the other section, an intermediate rim section, a locking pin upon one face of the intermediate section and movably engaging the grooved projection, a grooved projection upon the other face of the intermediate section and movably engaging the locking pin on the yieldingly supported section, and yielding spacing devices between the sections.

19. A wheel comprising a yieldingly supported sectional flexible rim, an elastic cushion within one of the sections, and a spring pressed plunger bearing upon said cushion and disposed to extend beyond said section.

In testimony that I claim the foregoing as my own, I have hereto affixed my signature in the presence of two witnesses.

CARROLL M. BELL.

Witnesses:
ZIBU F. LITTLE,
CHARLES WILSON.